R. BOEKLEN.
Machines for Making Bungs.

No. 135,196. Patented Jan. 28, 1873.

Witnesses
F. Schultheis
H. W. Manning

Inventor
R. Boeklen

2 Sheets--Sheet 1.

AM. PHOTO-LITHOGRAPHIC CO. N.Y. (OSBORNE'S PROCESS)

R. BOEKLEN.
Machines for Making Bungs.

No. 135,196.

2 Sheets--Sheet 2.

Patented Jan. 28, 1873.

Witnesses.

Inventor.
R. Boeklen

UNITED STATES PATENT OFFICE.

REINHOLD BOEKLEN, OF BROOKLYN, NEW YORK.

IMPROVEMENT IN MACHINES FOR MAKING BUNGS.

Specification forming part of Letters Patent No. 135,196, dated January 28, 1873.

*To all whom it may concern:*

Be it known that I, REINHOLD BOEKLEN, of the city of Brooklyn, in the county of Kings and State of New York, have made certain new and useful Improvements in Machines for Making Longitudinal Grained Bungs, of which the following is a specification:

In my mode of manufacturing said bungs the lumber, after being cut into square bars of the diameter or size of the bung, is passed through a dowel or molding machine, and the bar is made round or its corners are cut off. The rounded bars are fed into horizontal hollow spindles, with which the machine for cutting the bungs is furnished on each side, and are, by means of reciprocating pawls upon the said spindles, simultaneously fed along the length of a bung on the one side of the machine, and then on the other; and, by means of a central frame vibrating in front from the spindles of one side of the machine to those of the other, and furnished with circular saws and stationary cutters, a bung is shaped and another cut from each of said bars on the one side of the machine, while the bars on the other side are fed and placed to have the bungs shaped and cut for the succeeding vibration of said frame, its saws, and cutters. By means of passing the square bars, as stated, through the dowel-machine and rounding them first, less stoppages are required of the bung-cutting machine for the purpose of sharpening the cutters, these having less cutting to do than they have in machines in which the bung is cut and shaped directly from the square bar. By means of providing the machine to cut and shape and finish bungs in the same time while the bars for others are fed ready for being cut and shaped with the succeeding movement of the cutters and saws, a very large quantity of bungs is produced with the machine. The bungs in my mode of production are made equally smooth, the same as those made by hand; and for the purpose of having said bungs tight against undue leakage, I pass each of them through a pressing-machine, in which they are guided from said cutting-machine and become sufficiently compressed to have their porous portions closed up.

Figure 1:
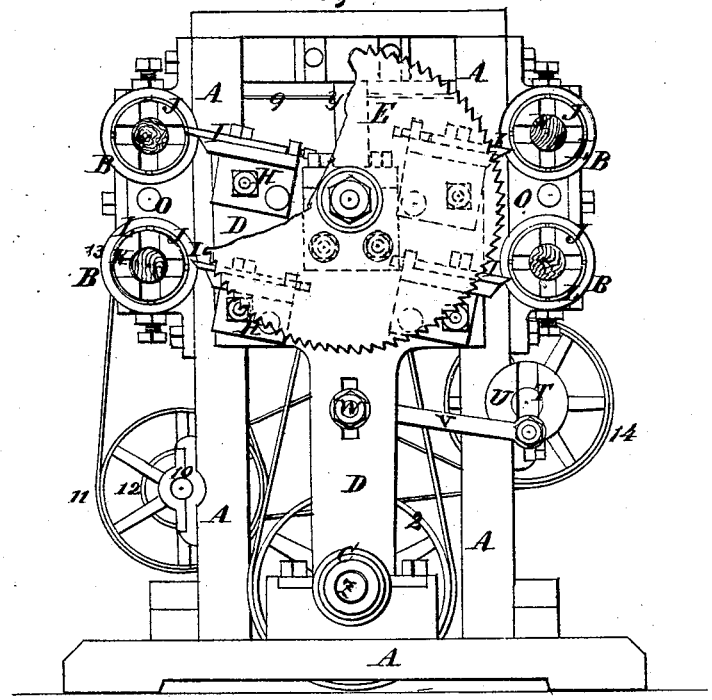
Figure 4:
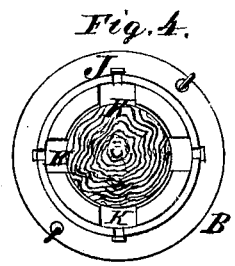
Figure 5:
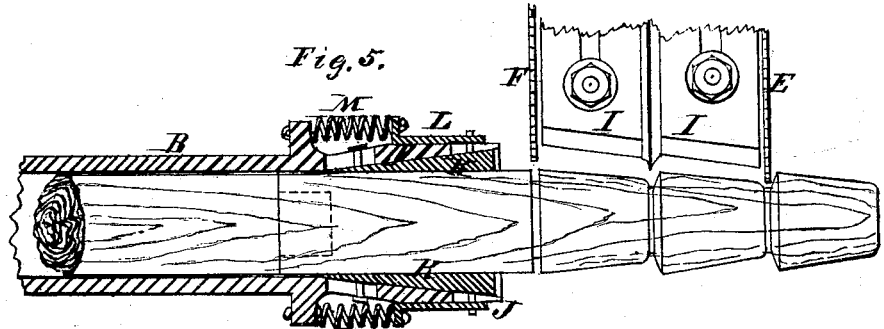
Figure 6:
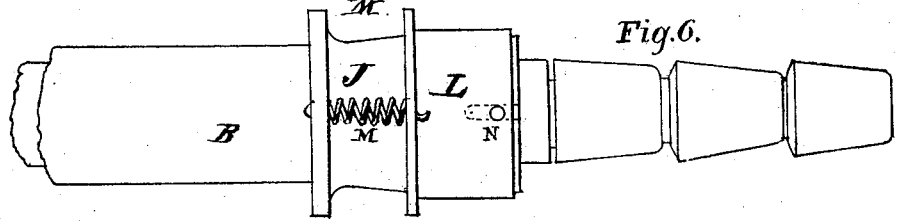
Figure 2:
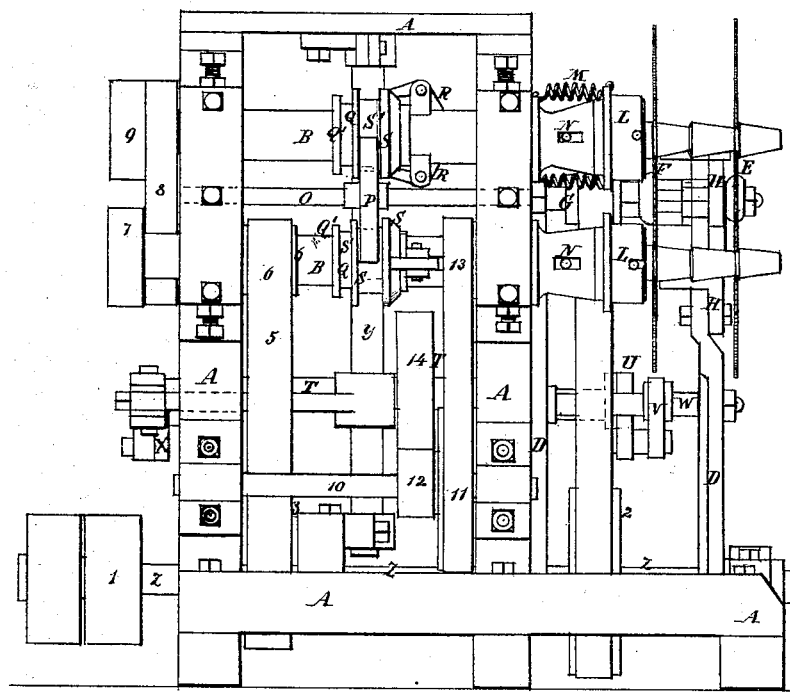
Figure 3:
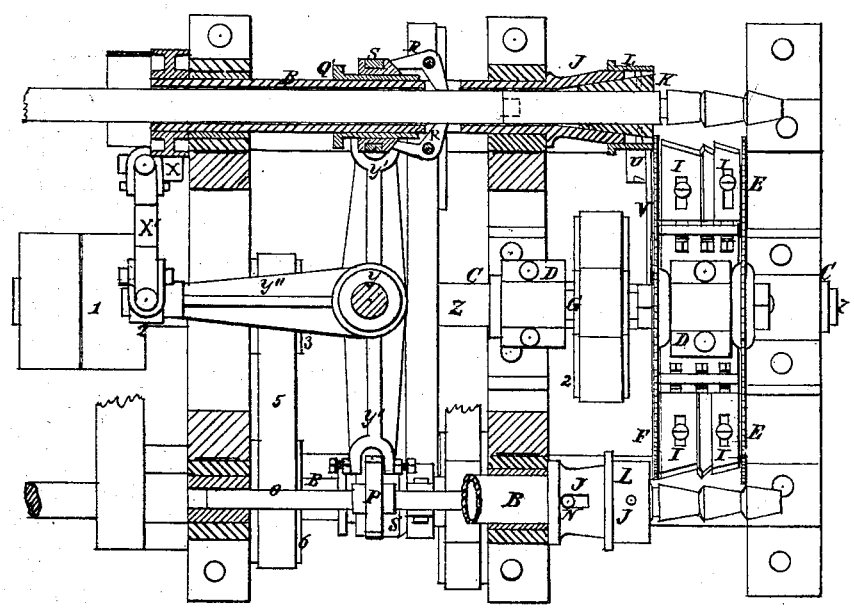

In the annexed drawing, Figure 1 represents a face view of the machine for shaping and cutting off the bungs according to my improvements. Fig. 2 is a side view of the same. Fig. 3 is a horizontal section of the same. Fig. 4 is a detached face view of one of the chucks or spindle-heads of the machine, shown on a somewhat larger scale than in the former figures. Fig. 5 is a horizontal section of the same, showing also the cutters and saws relatively with the bungs as they are cut and shaped. Fig. 6 is a side view of the same.

Similar letters of reference indicate corresponding parts in the several figures.

A represents the frame of the machine. On each side of it are arranged, in adjustable bearings, the hollow horizontal spindles B B B B, and centrally on the forward part of the frame is arranged a vertical frame, D, which has trunnions C C working in bearings located in the lower part of the frame A, so that it can vibrate between said spindles; and in bearings on the top part of said frame is arranged a central saw-arbor, having upon its forward part a circular saw, E, which serves to cut off the finished bungs, and has between its bearings a secondary saw, F, and a small driving-pulley, G, of which the saw F is used to cut a groove in the bars at the place of separation of the bungs to facilitate cutting of the chamfer at that portion of the bungs. The forward part of said frame D between said saws is made with vertical extensions on each side of the bearing of said saw-arbor, which extensions serve to secure the tool or cutter rests H H by means of proper bolts through them, and the cutters I I for shaping the bungs are bolted to said rests in manner to be easily adjusted to the bars. In the machine shown two of the hollow spindles B B are employed on each side of the machine, and each of them is provided with a chuck, J, or head on its forward end to clamp the bar firmly while the bungs are being shaped. Each chuck J is bored out tapering, as shown, and has two, three, or more equally-distributed wedge-shaped slides, K K, of the same dimensions, and they are guided by segmental pieces on their side, the said pieces being firmly secured in the bore of the chuck. The slides K K are connected and moved together by means of a sleeve, L, fitted over the forward end of the chuck, and having studs N passing into said slides K through slots in the chucks. To each sleeve are attached two or more spiral springs, M M, which have their loose ends secured on a fixed shoulder of the spindle. By means of the slides K K moving together the bar is clamped concentrically when it is moved forward. The friction of the bar against the said slides is sufficient to counteract the springs M M and permit the bar to slide with facility. As soon as the pressure of the bar forward stops the springs draw up the slides or wedges K K and hold the bar centrally and clamp it very tightly. Upon the portion within or between the bearings of the spindles B B I have upon each a sleeve, Q, which has ears cast on its forward end, to which are pivoted the feeding-pawls R R, and the spindle is slotted to allow said pawls to enter to the bore of the spindle and clamp the bar within whenever the pawls are moved forward.

Instead of usually employing springs, acting on these pawls to cause them to bear on the bar to be fed, I employ a secondary sleeve, S, upon the sleeve Q, which has its forward end tapered to engage rear arms of said pawls and force them apart, and their forward ends together to clamp the wood or bar. The rear parts of the sleeves S S have each a groove, S', on their periphery, and a common shifter-plate, P, upon a shifter-bar, O, centrally between and parallel with the two spindles of each side, engages in said grooves of the sleeves S, and on said shifter-plate moving forward the pawls are caused to clamp the bar, and the sleeve Q with the bar caused to move forward also. For moving the sleeve Q and its pawls rearward I provide said sleeve on its rear end with a shoulder, Q', with which the sleeve S comes in contact in moving rearward. The shifter-bar O has its ends passing and guided in the supports of the journal-boxes of the spindles B B. To obtain the alternate feed of the bar and vibrating motion of the frame D, its saws, and cutters, I employ a common horizontal counter-shaft, T, resting in bearings located on the side of the machine, which has a crank, U, on its forward end, and a crank, X, in the opposite direction on its rearward end. Both of these cranks have adjustable crank-pins, of which the pin on the crank U is connected with the frame D by means of a fixed stud, W, on the said frame, and a pitman, V, fitted over said pin and stud, and of which the pin of the crank X transfers reciprocating motion to both shifter-rods O O by means of a central vertical rock-shaft, Y, provided with two arms, Y' Y', extending and made with forked ends to engage the sides of the shifter-plates P P on each side of the machine, and provided with one arm, Y'', extending rearward and connected with said pin of the crank X by means of the pitman X', which has universal joints to provide for the sideward motion to which it is subject in transferring the motion to shafts right angular to one another. By means of a horizontal central shaft, Z, in the lower part of the machine, and having its forward bearings in the trunnions of the frame D, and its rearward ones in the rear of the machine, and having a proper-sized pulley, 2, corresponding with the pulley G of the saws E and F within the frame D, and having the driving-pulley 1 on its rear end, and the pulley 3 corresponding with a pulley, 6, on one of the spindles B, I transmit rotary motion to one of the spindles B and to the saws F and E, and the remainder of the spindles B obtain their motion from the former by means of pulleys fixed on the rear ends of the spindles and belts 7, 8, and 9 over them and passing from one to the other. The counter-shaft T has a very slow motion. It may be driven from any convenient shaft of the locality; or it may be driven, as shown, by means of a secondary shaft, 10, arranged on the opposite side of the machine to that of the shaft T, the said shaft 10 receiving motion from a pulley, 13, upon one of the spindles B and transferring it to a pulley, 11, upon shaft 10, upon which is also a pulley, 12, which transmits the said motion upon a pulley, 14, secured upon shaft T.

The saws E and F are geared, to have the usual rapid speed, like other circular saws, and the spindles B that of an ordinary wood-turning lathe. The shaft T has a very slow movement, and it may be driven on that account from a separate counter-shaft and provided with means for stopping separately.

It will be perceived that the bars for bungs are fed on one side of the machine at the same time while the bungs on the bars of the opposite side are shaped and cut off, and that the time for shaping the bungs is nearly reduced to the time required for cutting them off.

In order to feed the ends of the bars completely through the machine and to work up the same almost entirely and without requiring the machine to stop for the purpose, I make a tenon and drill a corresponding hole and form a socket upon the ends of the bars, so that the tenon on the succeeding bar will tightly meet in the socket of the foregoing bar, as indicated in Fig. 5.

Having fully described my invention, what I claim as new, and desire to secure by Letters Patent, is—

1. The devices, herein shown and described, for feeding, for shaping, and for cutting off the bungs, when constructed and operated substantially as and for the purpose herein stated.

2. The combination of the sleeve L with the slides K K, springs M, and arbor B, substantially as herein set forth.

3. The combination of the sleeve Q, the pawls R R with the secondary sleeve S, when operating substantially as and for the purpose herein described.

R. BOEKLEN.

Witnesses:
    F. SCHULTHERS,
    H. R. MENSING.